United States Patent
Lambert et al.

(10) Patent No.: US 9,996,997 B2
(45) Date of Patent: Jun. 12, 2018

(54) METHOD AND SYSTEM FOR CONTROLLING ACCESS TO OR THE EXIT FROM AN AREA

(71) Applicant: Morpho, Issy les Moulineaux (FR)

(72) Inventors: Laurent Lambert, Issy les Moulineaux (FR); Olivier Touret, Issy les Moulineaux (FR); Pierre Chastel, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days. days.

(21) Appl. No.: 15/034,392

(22) PCT Filed: Nov. 12, 2014

(86) PCT No.: PCT/EP2014/074395
§ 371 (c)(1),
(2) Date: May 4, 2016

(87) PCT Pub. No.: WO2015/071325
PCT Pub. Date: May 21, 2015

(65) Prior Publication Data
US 2016/0300414 A1 Oct. 13, 2016

(30) Foreign Application Priority Data
Nov. 12, 2013 (FR) .................... 13 61019

(51) Int. Cl.
*G07C 9/00* (2006.01)
*G06F 21/32* (2013.01)
*G06F 21/34* (2013.01)
*G06F 17/30* (2006.01)

(52) U.S. Cl.
CPC ... *G07C 9/00158* (2013.01); *G06F 17/30876* (2013.01); *G06F 21/32* (2013.01); *G06F 21/34* (2013.01); *G07C 9/00* (2013.01)

(58) Field of Classification Search
CPC .... G06F 17/30876; G06F 21/34; G06F 21/32; G07C 9/00158; G07C 9/00; G07C 9/00087
See application file for complete search history.

(56) References Cited

U.S. PATENT DOCUMENTS

| | | | |
|---|---|---|---|
| 2004/0002894 A1* | 1/2004 | Kocher | G07C 9/00087 705/13 |
| 2004/0102991 A1* | 5/2004 | Casey | G06Q 10/0831 705/331 |

(Continued)

FOREIGN PATENT DOCUMENTS

| WO | WO-2006041416 | 4/2006 |
|---|---|---|
| WO | WO-2009128060 | 10/2009 |

OTHER PUBLICATIONS

International Search Report and Written Opinion with English Language Translation, dated Dec. 9, 2014, Application No. PCT/EP2014/074395.

(Continued)

*Primary Examiner* — Thomas Alunkal
(74) *Attorney, Agent, or Firm* — Womble Bond Dickinson (US) LLP

(57) ABSTRACT

The invention relates to a method for controlling access to or exit from a controlled area, implemented in a system comprising at least one database comprising: a first data set, comprising biometric data of persons linked with identifiers of means of transport or travel; and a second data set including at least one piece of data such as marital status and/or identity document and at least one piece of personal biometric data, the method being characterized by implementing steps that comprise: for each vehicle, acquiring an identifier of the means of transport or travel, and biometric data of at least one passenger in the vehicle; for each passenger for which biometric data has been acquired, determining whether said passenger is recorded in the first (Continued)

data set linked with the vehicle; if a passenger is not recorded in the first data set linked with the vehicle, verifying that the passenger is recorded in said set linked with another vehicle or, failing that, that said passenger is recorded in the second data set; and, in accordance with the result of the verification carried out, updating the first data set such that said set includes biometric data of the passenger linked with the vehicle. The invention also relates to a control system suitable for implementing the method.

21 Claims, 3 Drawing Sheets

(56) References Cited

U.S. PATENT DOCUMENTS

| | | | |
|---|---|---|---|
| 2006/0206724 A1* | 9/2006 | Schaufele | G06F 21/32 713/186 |
| 2006/0286969 A1* | 12/2006 | Talmor | G06F 21/32 455/415 |
| 2008/0136625 A1* | 6/2008 | Chew | G01V 5/0008 340/540 |
| 2008/0147246 A1* | 6/2008 | Cochran | G07C 9/00087 701/1 |
| 2012/0213417 A1 | 8/2012 | Kocher, Jr. et al. | |
| 2013/0086090 A1* | 4/2013 | Partington | G06K 9/00973 707/754 |
| 2014/0070917 A1* | 3/2014 | Protopapas | B60R 25/25 340/3.1 |
| 2014/0316607 A1* | 10/2014 | Le | B60R 16/037 701/1 |

OTHER PUBLICATIONS

French Search Report and Written Opinion, dated Jul. 29, 2014, French Application No. 1361019.

* cited by examiner

METHOD AND SYSTEM FOR CONTROLLING ACCESS TO OR THE EXIT FROM AN AREA

FIELD OF THE INVENTION

The invention relates to the field of methods and systems for controlling individuals making use of a vehicle or of any other transport means, upon entering or exiting a controlled area.

The invention notably applies to the control of individuals upon crossing the border of a country.

STATE OF THE ART

Proceeding with controls of identities of individuals upon passing a border whether this is a land, air, sea, or river border is widespread for entering the inside of a country.

Biometric technologies may be used in this context, on citizens of the country and/or national third parties. For example, biometric authentication may be achieved between a certified identity biometric datum which may be stored in an identity document and a passage verification biometric datum, acquired in real time on the individual to be controlled.

In certain cases, a certified identity biometry may be acquired upon entering a country, notably in order to make searches on security biometric databases. By "certified identity biometry", is meant that this biometry is acquired in a controlled environment notably in the presence of a state official who controls the elements justifying the declared identity of the individual during this biometric enrollment.

However, the biometric identity control of individuals leaving the country is much more rarely applied, and it is therefore impossible to reconcile the information collected upon exit with the information collected upon entering the country, which would allow more effective handling of transboundary movements and residency authorization periods on the territory.

Further, controlling the identity of individuals in a biometric way is still more difficult to apply in a context of land boundaries, where the passengers are found in vehicles and where the boundary crossing flow may be high.

Indeed, the fact of achieving biometric identification of passengers of vehicles may assume that the passengers have to get down from the vehicle, which strongly perturbs the traffic, or, even in the case when it is not necessary to get down from the vehicle, the time required for proceeding with identification may slow down the flow.

Fitting out vehicles with RFID chips has been proposed in order to be able to detect their crossing of the border. However, this method does not give the possibility of controlling the passengers of vehicles and does not give the possibility of implementing systematic control since only the fitted-out vehicles may be controlled.

In the present state of the art, it is therefore today not possible to biometrically control the whole or even a large proportion of passengers crossing a land frontier notably with their vehicles and who has to be controlled according to the law of the country (for example national third parties, not citizens of the country), although this would be very useful for the needs of reconciling and handling of the borders mentioned above.

Therefore, there exists a need for proposing a method for controlling passengers of vehicles which is rapid, effective and secure.

From document WO 2009/128060, a method for controlling individuals at the entrance of a controlled area is known, comprising the acquisition of identifiers of a mobile telephone of an individual, if required linked with the identity data of the individual or a vehicle identifier.

The recovered data are recorded in a database.

The method proposed in this document is a pure method of collecting, and if required of making available data, related to the use of mobile telephones.

The described method is neither adapted to the flow control of vehicles entering or exiting a controlled area, nor to the identity control of individuals traveling in these vehicles.

PRESENTATION OF THE INVENTION

The object of the invention is to propose a method for controlling the passengers of a vehicle upon entering or exiting a controlled area such as a state, not having the drawbacks of the prior art.

Another object of the invention is to allow control of the passengers in a rapid way, and without imposing that the passengers get down from a vehicle for example in the case of a very busy land border.

Further another object of the invention is also to be able to establish the link, a link notably reinforced by the means of biometric controls, between the entering of individuals into a controlled area and their exiting.

In this respect, the object of the invention is a method for controlling individuals upon entering or exiting a controlled area, applied in a system comprising at least one database comprising:

a set of first data, so-called passage verification data, comprising biometric data of individuals in relation with identifiers of travel or transport means, and a set of second data, so-called certified identity data, comprising at least one civil registration datum and/or an identity document datum and at least one biometric datum of individuals, the method being characterized by the steps of:

for each vehicle, acquiring an identifier of the travel or transport means, and a biometric datum for verifying the passage of at least one passenger of the vehicle, for each passenger for which a biometric datum for passage verification has been acquired, determining, whether said passenger is recorded on the set of passage verification data in relation with the vehicle, if a passenger is not recorded in the set of passage verification data in relation with the vehicle, verifying that the passenger is recorded in said set in relation with another vehicle, or, by default, that he/she is recorded in the set of certified identity data, and depending on the result of the applied verification, updating the set of passage verification data so that it comprises a biometric datum of the passenger in relation with the vehicle.

Advantageously, but optionally, the method according to the invention may further comprise at least one of the following features:

the biometric datum of each passenger is acquired on the fly.

the biometric datum acquired on the fly is an iris image.

the verification that the individual is recorded in the set of first data in relation with another vehicle comprises the application of a step for comparison between the identity datum of the passenger and the set of the identity data stored in said set.

the verification whether a passenger is recorded in the set of second data if the passenger is not recorded in the set of passage verification data, comprises biometric authentication of the passenger, by comparing a biometric datum of authentication of the passenger with a certified identity biometric datum of the passenger, the authentication and certified identity biometries being data acquired on biometric features of a same nature.

The method further comprises, prior to the biometric authentication step, the acquisition of a datum of an identity document of the passenger, and access to a certified identity biometric datum of the passenger in the set of second data by comparison between said datum of the identity document and an identity document datum of the set of second data.

the compared data of identity documents each comprise a chain of characters, and the applied comparison comprises the establishment of a likelihood score between compared data, and the comparison of the score with a predetermined threshold.

the set of second data comprises biometric data recorded in identity documents of individuals, and the biometric authentication step is applied by comparing a biometric datum acquired on the individual with a certified identity biometric datum stored in an identity document of said individual.

the verification of the fact that a passenger is recorded in the set of second data if the passenger is not recorded in the set of first data comprises the biometric identification of the passenger by comparison between a biometric datum acquired on the individual and the certified identity biometric data recorded in the set of second data.

The method comprises a step consisting of directing the vehicle to an inspection area in the cases when the set of second data does not comprise any data relating to a passenger, or when a passenger does not have any identity document, or when biometric authentication has failed.

the step for updating the set of first data comprises the recording of an identifier of the vehicle in relation with a biometric datum of the passenger already recorded in said set, or the recording of the biometric datum of the passenger and of the identifier of the vehicle, in relation with the datum.

each passenger is enrolled in the set of second data upon entering of the individuals into said area.

the method is applied to one or two of the passengers of the front seats of a vehicle of the automobile type.

The method further comprises the suppression of passage verification identity data when these data are associated with a vehicle or travel for an elapsed time exceeding a predetermined threshold, or when the number of identity data associated with a vehicle or a travel exceeds a predetermined threshold.

An object of the invention is also a control system in a vehicle upon entering or exiting a controlled area, comprising:
at least one database comprising:
a set of first data, so-called passage verification data, comprising at least biometric data of individuals in relation with identifiers of travel or transport means,
a set of second data so-called "certified identity data" comprising at least civil registration data, data from identity documents and biometric data of individuals,
at least one biometric data sensor,
a device for acquiring an identifier of a travel or transport means, and
a processing unit, configured for controlling the sensor and for communicating the database, for applying the method according to the preceding presentation.

Advantageously, but optionally, the control system according to the invention may further comprise at least one of the following features:
the sets of first and second data are stored in disconnected databases.
the biometric data sensor is a biometric sensor on the fly of biometric features comprising: an iris, retina, fingerprint, palm, vein network, face image or voice signature.

The object of the invention is also a method for enrollment beforehand of an individual in a system according to the preceding presentation, the method comprising the recording in the set of first data of an identifier of the vehicle of the individual in relation with an identity datum of said individual.

Finally, the object of the invention is a computer program product, comprising code instructions adapted for applying the method according to the preceding presentation, when they are executed by a processing unit.

The proposed method gives the possibility of very rapidly controlling passengers making use of a transport means (for example an automobile vehicle) since, for all the recorded passengers and having already been subject to a same control onboard the same transport means, the method is summarized as a "1:1" or "1:few" comparison, i.e. a comparison between one or several biometric identity data already recorded of the number or of a limited number of passengers linked with this transport means and one or several biometric data acquired during the control of this or these same passengers upon crossing into the area.

If the individual has changed transport means, the control consists of carrying out a "1:n" comparison between the passage biometric datum acquired on the individual and the set of identity and biometric data recorded in the system.

If the biometric data of the individual acquired during the crossing has not been recorded, then the method gives the possibility of proceeding with the recording of these biometric data into the set of passage verification data of the database after having validated the identity of this individual with respect to the certified identity biometric data.

The application of this method repeatedly on the flow of vehicles to be controlled also allows gradually completing the first so-called passage verification data, so that more and more persons are recorded in the database in relation with one or several transport means, and thus the average time for passing the control point decreases.

Finally, the proposed method gives the possibility of establishing a link between the entering and exiting of an area by a same individual.

DESCRIPTION OF THE FIGURES

Other features, objects and advantages of the present invention will become apparent upon reading the detailed description which follows, with reference to the appended drawings, given as non-limiting examples and wherein.

DETAILED DESCRIPTION OF AT LEAST ONE EMBODIMENT OF THE INVENTION

Control System

Advantageously, the control system is found at the entrance or at the exit of a controlled area.

In a preferred embodiment, the controlled area is a country, and the control system is at the frontier of the country. According to an alternative embodiment, the controlled area is a private or highly secured administrative site (an industrial site such as a nuclear power plant, the site of a government agency, etc. . . . ).

In this context, the entering or the exiting of the area by a passenger is achieved onboard a vehicle, which may be a land, sea, air, river vehicle, etc.

Figure 1:
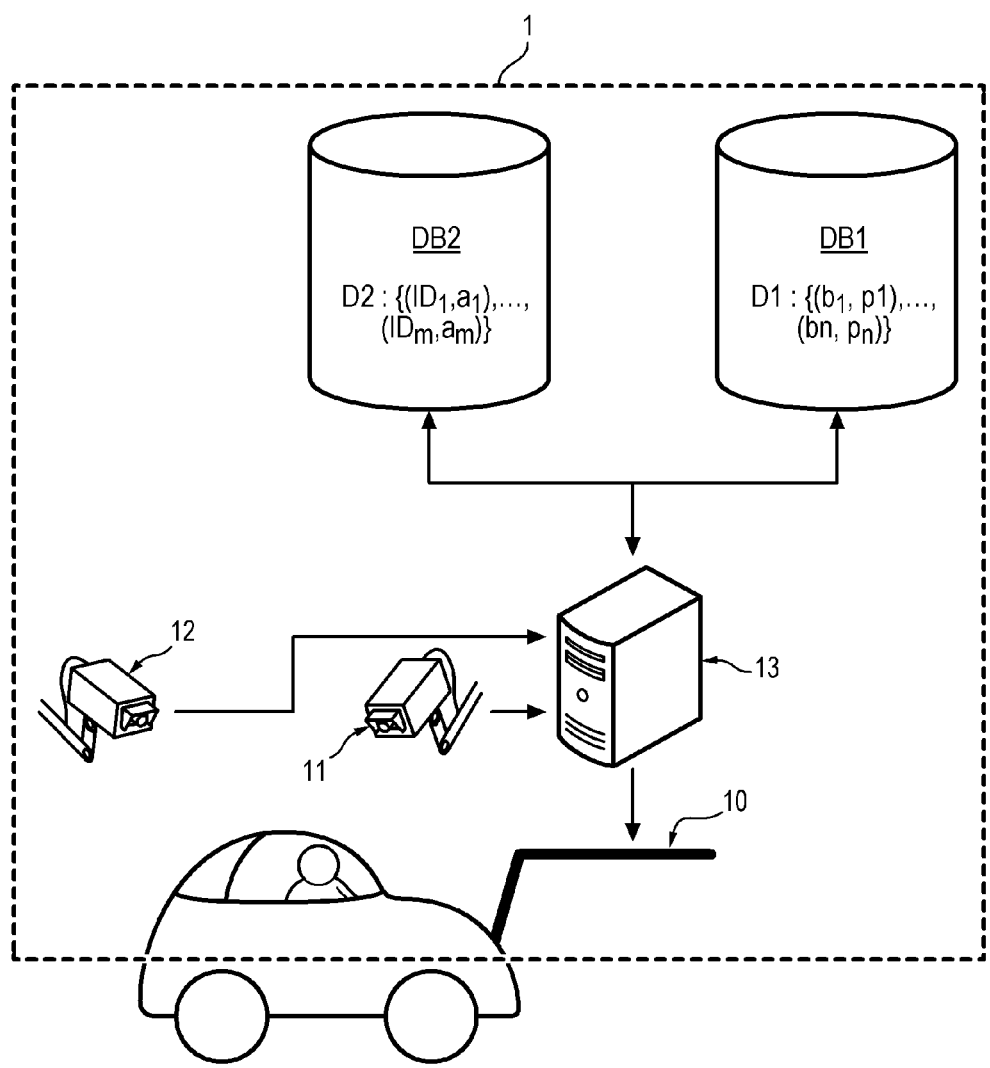
FIG. 1 schematically illustrates a system for applying a control method.

With reference to FIG. 1, the control system 1 has been schematically illustrated for controlling the access to or the exit of individuals from the controlled area.

The system 1 is located at the entrance or at the exit of a controlled area, and the control point applied by the system 1 is materialized by a control point, a barrier 10, a gantry or any other equivalent for materializing the crossing of the area.

However, certain elements of the system may be at a distance and be accessible through a telecommunications network such as Internet.

The system 1 comprises at least one database capable of storing:
  a set of first data D1, so-called passage verification data, comprising identifiers of travel and/or transport means, and identity data.

These data are said to be passage verification data since they are acquired during a control at the entrance or at the exit of the controlled area, advantageously rapidly, or even on the fly, as described hereafter.

A set of second data D2, so-called certified identity data, typically comprising civil registration data of individuals, biometric identity data, and data from identity documents.

These data are said to be certified identity data since, for enrolling an individual in this set of data, the data are acquired under the control of an authorized official, who verifies whether the identity of the individual given on his/her identity document actually corresponds to the individual on which the biometric data are acquired, so that all the data associated with the civil registration data are recognized as matching the identity of said civil registration.

Thus, this enrollment may take place for example during a first access of the passengers to the area (for example upon entering a country), the control method then being applied upon exiting the area or during re-entry afterwards.

The structures of both set of data D1, D2 will now be described in more details.

The set of first data D1 comprises identity data of individuals $b_1, \ldots b_n$, associated with identifiers of travel or transport means $p_1, \ldots, p_n$. The identity data of individuals are advantageously biometric data, but may also be identity data appearing on an identity document such as a passport or identity card number.

All the biometric data of this set D1 are digital acquisitions of biometric features of same nature. The biometric data are thus advantageously images of irises or acquisitions of fingerprints, or else further images of faces.

By vehicle, is meant any type of vehicle equally coming under the railway, roadway, sea way, river way, or airway sectors, regardless of its contents. Thus, by vehicle is equally meant any vehicle of private persons (cars, motorcycles, boats, etc. . . . ) as well as any non-individual vehicle or any collective transportation means, which may be used by many travelers (airplanes, liners, trains, buses, etc. . . . ).

The identifiers of travel or transport means $p_1, \ldots, p_n$ are selected so as to allow the identification either:
  of said vehicle with which the individuals penetrate the controlled area when the latter is a private vehicle or
  of said travel of said vehicle by which the travelers penetrate the controlled area when the latter is a collective transportation means.

Thus, in the case of private vehicles, the identifiers of vehicles $p_1, \ldots, p_n$ are advantageously the license plate number of the vehicle, since all vehicles have a license plate and may thereby be identified in a unique way.

According to alternative embodiments, the identifiers may also be a highway card identifier associated with the vehicle, series numbers of parts of the engine, etc. An identifier of a transport means may also comprise a combination of several identification data like the aforementioned data.

In the case of non-individual vehicles, the identifiers of vehicles $p_1, \ldots, p_n$ are advantageously and in a non-exhaustive way: a flight number, a train number, a travel number, or any identifier of the travel operated by the relevant collective transportation means.

The set of second data D2 may also comprise, in addition to the certified identity data, pieces of information relative to the access authorizations of the individuals inside or outside the controlled area, these pieces of information may for example describe the right of way through the area or of residing in the area, and optionally the steps to be taken towards the passenger when he/she appears at the passage point and the additional verification procedures to be applied to him/her if necessary. For example, this may be a national database stating the authorization of entering the territory.

The set D2 then comprises identity profiles of individuals $ID_1, \ldots ID_m$ associated for each individual with information relating to the accesses relatively to passing inside or outside the controlled area $a_1, \ldots a_m$. Each $a_i$ may assume different values, for example but not as a limitation, yes or no, 1 or 0, etc., if the question is to respectively notify authorization or prohibition of penetrating into the area.

The set of certified identity data D2 advantageously comprises profiles of the whole of the persons having already entered or left the controlled area, or having already made an enrollment in the system in preparation for entering or exiting the area.

Advantageously, an identity profile of an individual is generated in this set, and associated with an authorization for accessing the area, during or before entry of the individual into the controlled area, and the control method described hereafter is applied upon exiting of the individual from the area.

An identity profile of an individual comprises at least one biometric datum of the individual. This may notably be an image of the face or a fingerprint capture, or else further an iris image. This biometric datum was directly acquired on the individual, or on an identity document of the individual, it being understood that, in this second case, during the enrollment of the individual in this set of data D2, a biometric datum acquired on the individual is compared with the biometric datum acquired on the identity document, in order to limit fraudulent risks, either one or both data then being recorded in the set D2.

The identity profile also comprises at least one identity datum which may be obtained on an identity document of the individual, such as for example a passport or identity card number, or the names, forenames and date of birth of the individual.

The data of both sets may advantageously be recorded in one or several databases by any means giving the possibility of preserving the confidentiality of the information such as for example the sharing of secret information, encoding or encryption of said data.

According to a first embodiment, both sets of data are recorded in a common database. Alternatively, the identity data and the passage data are respectively stored in two databases DB1 and DB2, as illustrated in FIG. 1.

The system also comprises at least one biometric data sensor 11, schematically illustrated by a camera, for acquiring for example an image of the face of a passenger, but which is advantageously a biometric data sensor on the fly, and preferably an iris image sensor or a fingerprint sensor on the fly.

Such a sensor may for example be the sensor MORPHO IAD™, which allows acquisition of an iris or face image in less than a second and at a distance of about one meter from the individual. This notably allows acquisition of an iris image of a passenger of a vehicle, without the latter getting down from the vehicle.

Another sensor may be the sensor "Finger on the Fly" from Morpho which allows acquisition of a fingerprint on the fly, also without forcing the passengers of a vehicle to get down from it for proceeding with the acquisition.

Advantageously and if necessary, the sensor comprises a second biometric sensor such as an iris sensor or a face image, fingerprint, palm, vein network image sensor, the use of which is detailed hereafter.

The system also comprises a device 12 for acquiring an identifier of a travel or transport means. In the case when the identifier of the travel or transport means is a number, such as a license plate number or a barcode, a 2D barcode, such as the QR code or alternatively an image or any other 2D or 3D representation, the device 12 may be a camera or a still camera completed with an image processing system for detecting said identifier of a travel or transport means (for ex.: the license plate number for an automobile vehicle, . . . ).

The system further comprises a device for reading an identity document, not shown in the figure. This system may acquire an identity number appearing on such a document, and optionally one or several biometric data recorded in the document or in an electronic chip, such as for example an image of the face or a fingerprint of an individual. The readout device may further comprise means for verifying the authenticity of the presented identity document.

Finally, the system 1 comprises a processing unit 13, comprising computation means, for example a processor, and which is adapted for controlling the biometric sensor(s), the device for reading an identity document and the device 12 for acquiring the identifier of a vehicle.

The processing unit 13 is further adapted for communicating with the database(s) DB1, DB2 comprising the sets of data D1, D2, by reading or writing. In this respect, the database(s) may be physically found on the site of the control point, or on the contrary at a distance from the latter. In the latter case, the processing unit 13 may access each database via a telecommunication network such as Internet.

Figure 2:
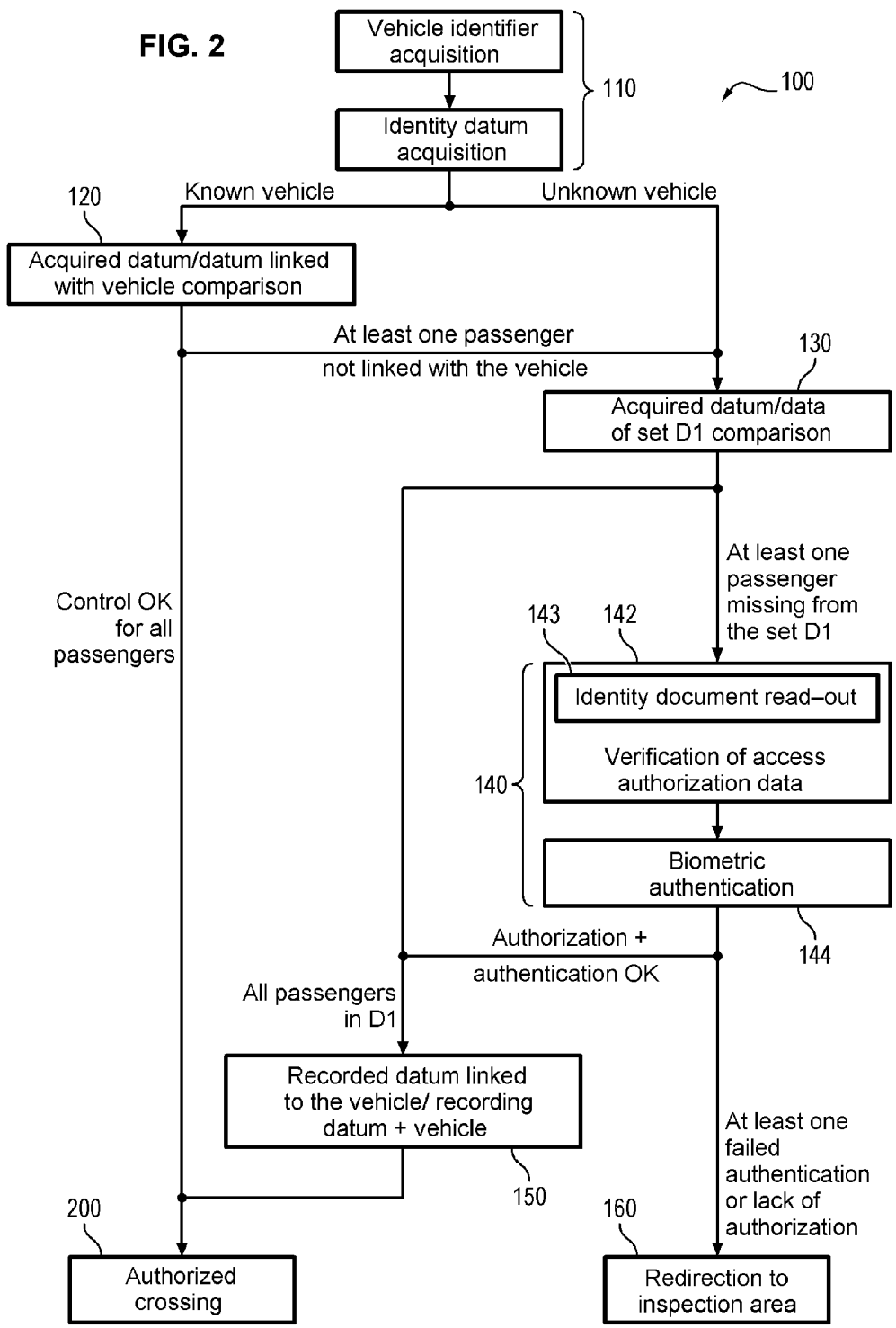
FIG. 2 schematically illustrates the main steps of the control method according to an embodiment of the invention.

The processing unit 13 is adapted to the application of the control method described hereafter with reference to FIG. 2, by executing dedicated code instructions.

Control Method

The method 100 for controlling passengers of a vehicle is applied for each vehicle crossing a control point 10 located at the entry or exit of a controlled access area.

It may be applied systematically on the whole of the passengers of the set of vehicles. However, in order to increase the rapidity and efficiency of the system, in the case when the vehicle is an automobile or a hauler (truck, etc.), it is preferable to process the passenger or both passengers sitting on the front seats of the vehicle. Indeed, as an example, the average number of passengers in cars crossing the US border is of about 1.8. By controlling two passengers per vehicle, it is therefore possible to process a large proportion of the passengers passing through the control point.

A first step of the control method comprises the acquisition 110 of an identifier of the vehicle by the acquisition device 12. This acquisition is preferably carried out on the fly, during the slow passage of a vehicle in a control area in which the system is installed.

Either simultaneously or not, a biometric sensor 11 acquires a biometric datum of one or several passengers of the vehicle, preferably of the passenger or the two passengers sitting on the front seats. This acquisition is preferably carried out on the fly so that the passengers do not have to get down from the car, or even do not have to stop the car, but only have it slow down for proceeding with the acquisition.

Once the identifier of the vehicle and biometric data are acquired for the passenger(s), these data are transmitted to the processing unit 13 which accesses the set of the first data D1 for passage verification.

The processing unit 13 verifies during a step 120, that the vehicle corresponding to the acquired identifier is recorded in this set of data D1.

If this is the case, the processing unit 13 verifies that each passenger, a biometric datum of which has been acquired, is recorded in the database in relation with the identifier of the vehicle.

By associating in the database the passengers with the vehicles, it is possible to limit the number of comparisons which are required for carrying out this verification. For example, for a vehicle belonging to a private person, the number of associated individuals is generally less than 10. The number of comparisons between the datum of a passenger and the passengers recorded with the vehicle is therefore less than 10.

For a rental car, this number may be greater since the car may successively be leased to a large number of persons. In this case, the processing unit 13 may apply a freshening method by suppressing from the set D1, the data of the individuals that have been recorded in relation with the vehicle since a too old date, or may suppress the oldest data once a threshold of the number of recorded data linked with the vehicle has been exceeded.

If each passenger of the vehicle, an identity datum of which has been acquired, is recorded in the passage verification data set D1 in relation with the vehicle, the crossing of the border of the controlled access area is authorized during a step 200.

If on the other hand at least one of the passengers of the vehicle is not recorded in this set in relation with this vehicle, or if the identifier of the vehicle is not recorded in the base, the processing unit 13 determines, for each passenger not linked to the vehicle in the base, during a step 130, whether each of these passengers is recorded in the set D1 in relation with another vehicle, by comparing the acquired identity datum on a passenger with the set of n identity data of the base, if necessary except for the identity data associated with the vehicle in which are found the passengers, since these data have already been compared with the datum of the passenger.

The whole of the comparisons of the biometric datum of the individual with the data of the set D1, notably in the case when the data are iris images or fingerprint images, may be achieved in limited times typically less than about 10 seconds by applying algorithms known to one skilled in the art.

If a datum acquired on a passenger corresponds to a datum of the set D1 in relation with another vehicle, the processing unit 13 proceeds with a step 150 for updating the passage verification data in the database. This update comprises:
- if the identifier of the vehicle is not found in the first data D1, the recording of the identifier of the vehicle in the set D1 and the generation of a link between the identifier of the vehicle and data of passengers already comprised in the set D1
- if the identifier of the vehicle is found in the first data, but is not linked with to the data of the passengers, the recording of each datum of the passengers in relation with said identifier, or generation of a link between the identifier of the vehicle and data of the passengers already comprised in the set D1.

If on the other hand the acquired datum on one of the passengers does not correspond to any biometric passage verification datum, the processing unit 13 proceeds to a step 140 for verifying whether the passenger is enrolled at the set D2 of certified identity data, and if necessary verifies the information on access authorization and the steps to be applied.

Firstly, the processing unit 13 accesses the profile of the passenger in the set D2 of second data (certified identity data) during a step 142, for verifying the access authorization status for the area associated with the passenger.

According to a first embodiment, the identity document reader of the system carries out reading 143 of an identify document of each passenger remaining to be controlled for this step, in order to obtain a datum for identifying the identity document. This identification datum is advantageously an identity card or passport number. Other pieces of information from the set of names, forenames, date of birth and optionally birth place of the passenger may be added thereto in order to compensate for a possible error in reading the passport number as described hereafter.

These data allow the retrieval of each passenger very rapidly in the base, by comparison with corresponding data appearing in the recorded identity profiles. This comparison may be achieved either in a simple way by strictly comparing the relevant chains of characters (notably the identifier of the identity document), or in a more complex way by establishing a likelihood score as regards the matching of the data read with the recorded data, by so-called name matching means and software packages. In this second case, one or several candidate records are recovered if their likelihood score is greater than a certain threshold defined beforehand and the comparison may be performed on the record having the best score or else on the whole of the candidates. This possibility provides compensation for possible readout errors.

Once the processing unit 13 has accessed the identity profile of the passenger in the set D2 of certified identity data, and has if necessary verified the access data of the passenger, the unit during a step 144 carries out a biometric authentication of the passenger, in order to control that he/she has not stolen the identity, with a false document, of the person recorded in the base. The order described above of the carrying out of the steps of authentication and verification of the access information may be reversed depending on the applications (an authentication step occurring before that of verification of the access information).

This biometric authentication is achieved by acquiring a biometric datum corresponding to a biometric feature of the same nature as the biometric datum recorded in the identity profile.

Preferably this is a fingerprint capture or that of an image of the face of the individual.

Alternatively, the method may utilize the principle of "derived identity". Upon enrollment of the individual in the set of certified identity data D2, two biometric data corresponding to distinct biometric features are acquired on the individual. For example, a first biometric datum is a face image or fingerprint image, and the other one is an iris image.

An authentication is achieved by comparing a first biometric datum with a biometric datum captured on the individual, optionally completed with the same datum recorded in the identity document, and then the second biometric datum is recorded in the profile.

In this case, during step 144, it is no longer necessary to proceed with acquisition of an additional biometric datum for the authentication as compared with the biometric identity datum recorded in the set D2, since the acquired datum (for example the iris image) during step 110 may be used for proceeding with the direct authentication on this datum.

If the authentication of the passenger is successfully carried out and if the access information allows this, then the processing unit 13 applies an update 150 to the set D1 of first data, by recording into the latter the biometric datum of the passenger in relation with the identifier of the vehicle, i.e. by enrolling this passenger in relation with the identifier of the vehicle in the set of first data D1.

If on the other hand the authentication has failed, or as the case may be if the access information of the passenger does not allow his/her passage without any additional verification, or if the control could not take place since the passenger did not have any identity document, the vehicle is directed during a step 160 to an inspection area.

Alternatively, during step 144, the processing unit 13 may seek the individual in the set of data D2 by identifying the latter by comparing a biometric datum acquired on the latter (during step 110 or during a new capture in step 144, depending on the nature of the corresponding biometric feature) with the whole of the biometric data recorded in the set of certified data D2.

As earlier, if a passenger of the vehicle has not been identified as an individual from the set of certified identity data D2, the vehicle is directed during step 160 to the inspection area.

According to further another embodiment, a passenger has an identity document comprising a biometric datum (for example recorded on a chip integrated to the document). This biometric datum may be considered as a certified identity datum belonging to the set D2 since, during the creation of the identity document, the individual was identified and his/her biometric datum was certified so as to be recorded in this document.

In this case, the authentication step 144 is carried out by comparing a biometric datum acquired on a passenger with a biometric datum recorded in his/her identity document.

Figure 3:
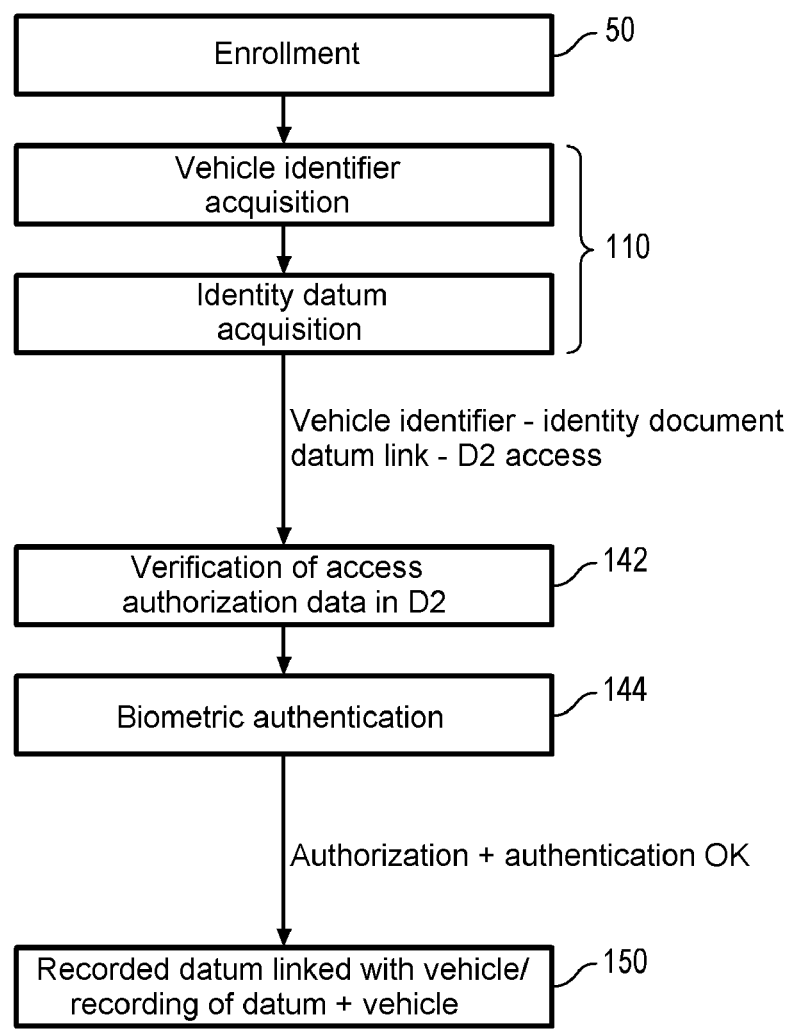
FIG. 3 schematically illustrates the main steps of an enrollment method in such a system.

Case of a Preliminary Enrollment in the Set of First Data D1 of the Control System With reference to FIG. 3, an adaptation of the method has been illustrated for a passenger of a vehicle who proceeds with preliminary enrollment in the set of passage verification data D1 of the system 1 in order to accelerate the entry or the exit from the area.

This preliminary enrollment may advantageously be carried out at a distance, via a telecommunications network like Internet.

The enrollment step 50 comprises the recording, in the set of first data D1, of an identifier of the used vehicle in relation with a datum from an identity document. For example, the enrollment step may comprise the acquisition of information of the identity document number type, civil registration data, etc., which are apparent on an identity document.

In this way, the set of first data D1 comprises an identifier of the vehicle, associated with identity data of one or a few (for example less than 10) individuals.

In this case, the step 110 for acquiring an identifier of the vehicle and a biometric datum of the passengers gives the possibility of obtaining in the set of first data D1, by accessing the identifier of the recorded vehicle, one or several data from recorded identity documents linked with this identifier.

The processing unit 13 may then directly access the profile of the passenger recorded in the certified identity information D2 by means of the thereby obtained information of the identity document, and control 142 the access data of the passenger. Therefore, one gets rid of the step for reading an identity document.

Step 144 then comprises the biometric authentication of each passenger by comparison of the biometric datum acquired on the individual with the datum recorded in his/her profile (when several passengers have been enrolled beforehand in relation with the vehicle, this authentication is more exactly a "1:few" identification between each passenger and the few profiles of the passengers recorded in the certified identity information D2), these are data corresponding to biometric features of same nature (for example iris image), or by acquisition of a new biometric datum on a biometric feature corresponding to the certified biometric datum recorded in the set D2, or further by utilizing the derived identity principle described hereinbefore.

Therefore, the enrollment gives the possibility of accelerating the first control, since in this case, for the passengers which are not yet recorded in the first database in relation with the used vehicle, the steps for controlling the access authorization are carried out more rapidly.

The method proposed therefore has many advantages.

During the gradual crossing of this control step by an increasing number of individuals, the set of first data D1 is completed. This gives the possibility of letting through more and more rapidly an increasing number of persons, since the control is then the control of information in this database.

Finally, in the case when the method is applied at the exit of an area, the second database comprising information relating to the entry into the area of the individuals, the method also gives the possibility of reconciling the pieces of information between the entry and the exit from the area for a same individual, for example by evaluating the elapsed time between the registration in the second database DB2 and the exit from the area.

The invention claimed is:

1. A method for controlling individuals upon entering or exiting a controlled area, applied in a system having at least one database including:
   a set of verification data comprising biometric data of individuals and identifiers of travel or transport means, wherein said biometric data of individuals are recorded as associated in said set to said identifiers of travel or said transport means,
   a set of certified identity data, comprising at least one civil registration datum and/or an identity document datum and at least one biometric datum of individuals,
   the method comprising:
   for each vehicle, acquiring an identifier of a travel or transport means, and a biometric datum for verifying the passage of at least one passenger of the vehicle,
   for each passenger for which a biometric datum for passage verification has been acquired, determining whether said biometric datum of the passenger is recorded as associated with the acquired identifier of travel or transport means in the set of passage verification data, and, if the passenger is present in the passage verification data, authorizing the passenger having said biometric datum to enter or exit the controlled area with the vehicle having said identifier, without inquiry of the certified identity data,
   if the association between said identifier of travel or transport means and said biometric datum of the passenger is absent from the passage verification data verifying that the passenger biometric datum is recorded in said set as associated with another vehicle, or, by default, that the passenger is recorded in the set of certified identity data, and
   if the result of any of the previous verifications is positive leading to authorization of entry in or exit from the controlled area, updating the set of passage verification data so that said set of passage verification data comprises a biometric datum of the passenger associated with said identifier of travel or transport means, said passenger being authorized entry to or exit from the controlled area with said vehicle at later occurrences of the control method without inquiry of the certified identity data,
   wherein the association between said biometric datum of said passenger and said identifier of travel or transport means is suppressed when said association has been present in the passage verification data for an elapsed time exceeding a predetermined threshold, or when the number of biometric data of individuals associated with said identifier of travel or transport means exceeds a predetermined threshold.

2. The control method according to claim 1, wherein the biometric datum of each passenger is acquired on the fly.

3. The control method according to claim 2, wherein the biometric datum acquired on the fly is an iris image.

4. The control method according to claim 1, wherein the verification that the biometric datum and another vehicle identifier are recorded as associated in the set of passenger verification data comprises comparing the identity datum of the passenger and the set of the identity data stored in said set.

5. The control method according to claim 1, wherein the verification whether a passenger is recorded in the set of second data if the passenger is not recorded in the set of passage verification data comprises a biometric authentication of the passenger, by comparing the biometric datum of authentication of the passenger with the certified identity biometric datum of the passenger, the authentication and certified identity data being data acquired on biometric features of a same nature.

6. The control method according to claim 5, further comprising, prior to the biometric authentication step, the acquisition of a datum of an identity document of the passenger, and access to a certified identity biometric datum of the passenger in the set of second data by comparing said datum of the identity document and an identity document datum of the set of certified identity data.

7. The control method according to claim 6, wherein the compared data of identity documents each comprise a chain of characters, and the comparison comprises the establishment of a likelihood score between compared data, and the comparison of the score with a predetermined threshold.

8. The control method according to claim 5, wherein the set of certified identity data comprises biometric data recorded in identity documents of individuals, and the biometric authentication step is applied by comparing a biometric datum acquired on the individual with a certified identity biometric datum stored in the identity document of said individual.

9. The control method according to claim 1, wherein the verification of the fact that a passenger is recorded in the set of certified identity data if the passenger is not recorded in the set of passage verification data comprises the biometric identification of the passenger by comparing a biometric datum acquired on the individual and the certified identity biometric data recorded in the set of certified identity data.

10. The control method according to claim 5, comprising directing the vehicle to an inspection area in the cases when the set of certified identity data does not comprise any data relating to a passenger, or when a passenger does not have any identity document, or when biometric authentication has failed.

11. The control method according to claim 1, wherein the step for updating the set of passage verification data comprises the recording of an identifier of the vehicle as associated with a biometric datum of the passenger already recorded in said set, or the recording of the biometric datum of the passenger and of the identifier of the vehicle as associated with each other.

12. The control method according to claim 1, applied at the exit of a controlled area, wherein each passenger is enrolled in the set of certified identity data upon entering of the individuals into said area.

13. The control method according to claim 1, the method being applied to one or two of the passengers of the front seats of an automobile.

14. A system for controlling individuals in a vehicle upon entering or exiting a controlled area, comprising:
    at least one database comprising:
        a set of passage verification data, comprising at least biometric data of individuals and identifiers of travel or transport means, the biometric data of an individual of said set of first data being recorded as associated in said set to identifiers of travel or transport means,
        a set of certified identity data comprising at least civil registration data, identity documents and biometric data of individuals,
    at least one biometric data sensor,
    a device for acquiring an identifier of a travel or transport means, and
    a processing unit, configured for controlling the sensor and for communicating with the database, for applying the method according to claim 1.

15. The control system according to claim 14, wherein the set of passage verification data and set of certified identity data are stored in disconnected databases.

16. The control system according to claim 14, wherein the biometric data sensor is a biometric sensor on the fly of biometric features comprising: an iris, retina, fingerprint, palm, vein network, face image or voice signature.

17. The control method according to claim 1, further comprising a preliminary step of recording in the set of passage verification data of an identifier of the vehicle of an individual as associated with an identity datum of said individual.

18. A non-transitory computer program product, comprising code instructions adapted for applying the method according to claim 1, when they are executed by a processing unit.

19. The control method according to claim 1, wherein if a passenger is authorized to enter the controlled area, recording in the set of passage verification data the association between the identifier of the vehicle and the biometric datum of the passenger.

20. The control method of claim 1, wherein the step of updating comprises, if the passenger is authorized to access the controlled area with the vehicle as a result of the verification, the recording in the passage verification data of the acquired biometric datum of the passenger associated with the acquired vehicle identifier.

21. The method of claim 1, wherein the association is suppressed from the passage verification data when the number of biometric data of individuals associated with the identifier of travel or transport means exceeds ten.

* * * * *